United States Patent [19]

Leenhouts et al.

[11] Patent Number: 4,609,255
[45] Date of Patent: Sep. 2, 1986

[54] LIQUID CRYSTAL DISPLAY WITH TWIST ANGLE LESS THAN 80 DEGREES

[75] Inventors: Frans Leenhouts, Schliern; Maarten de Zwart, Niederrohrdorf, both of Switzerland

[73] Assignee: U.S. Philips Corporation, New York, N.Y.

[21] Appl. No.: 626,196

[22] Filed: Jun. 29, 1984

[30] Foreign Application Priority Data

Jul. 1, 1983 [CH] Switzerland .................. 3625/83

[51] Int. Cl.⁴ .................................. G02F 1/13
[52] U.S. Cl. ............................ 350/341; 350/337
[58] Field of Search ..................... 350/337, 341

[56] References Cited

U.S. PATENT DOCUMENTS

| | | | |
|---|---|---|---|
| 3,787,110 | 1/1974 | Berreman et al. | 350/341 |
| 3,914,022 | 10/1975 | Kashnow | 350/341 X |
| 3,977,767 | 8/1976 | Okuma et al. | 350/341 |
| 4,039,252 | 8/1977 | Mizuno et al. | 350/341 X |
| 4,398,803 | 8/1983 | Pohl et al. | 350/337 X |
| 4,427,741 | 1/1984 | Aizawa et al. | 350/337 X |
| 4,552,436 | 11/1985 | Kozaki et al. | 350/347 R X |

*Primary Examiner*—John K. Corbin
*Assistant Examiner*—Richard F. Gallivan
*Attorney, Agent, or Firm*—Paul R. Miller

[57] ABSTRACT

A liquid crystal display wherein in order to obtain an improved contrast without diminishing the brightness of the display, the angle of twist is reduced in the case of a liquid crystal display according to the rotating cell principle, polarizers with greater extinction power are used and up to 3% by weight of a suitable dye is added. Thus, a largely achromatic display is also obtained.

5 Claims, 3 Drawing Figures

LIQUID CRYSTAL DISPLAY WITH TWIST ANGLE LESS THAN 80 DEGREES

BACKGROUND OF THE INVENTION

1. Field of the Invention

This invention relates to a liquid crystal display formed by a nematic liquid crystal contained between opposed support plates, which have formed thereon successive electrode and orientation coatings, and further including front and back polarizers.

2. Description of the Prior Art

Such a liquid crystal display as above noted is known, for example, from DE-B-31 38 518, which discloses a based on the rotating cell principle and consisting of parallel support plates which, with a frame, form a cell. A nematic liquid crystal with positive dielectric anisotropy is filled into the cell. Orientation coatings are provided on the electrode coatings applied to the inner surfaces of the support plates. The orientation coatings orient the adjacent liquid crystal molecules uniformly at a slight tilt. The privileged directions of the orientation coatings form an angle of about 70° with one another. A front polarizer, whose polarization axis runs parallel to the privileged direction of the adjacent orientation coating, is provided on the front plate. A back polarizer, whose polarization axis runs perpendicular to the privileged direction of the adjacent orientation coating, is provided on the back plate. The distance between the support plates is 10 $\mu$m and the anisotropy of the index of refraction of the liquid crystal is about 0.13.

The brightness of the display in comparison with an ordinary rotating cell display, with the same contrast ratio, is less. It can be gathered from FIG. 3 of this specification that, in spite of everything, the display exhibits a light coloring which becomes greater with decreasing coating thickness of the liquid crystal.

SUMMARY OF THE INVENTION

Accordingly, the objects of the invention are to provide a novel liquid crystal display which improves upon the liquid crystal display mentioned above in such a way that it exhibits less coloring and an enhanced contrast without the brightness being greatly diminished.

The invention is based on the knowledge that by a greater extinction power of the polarizers in combination with a reduction of the angle between the orientation directions and addition of a small portion of dye, especially with a spectral color complementary to the display color, a display having a largely neutral color is obtained.

One of the most important advantages of the invention is the improved contrast with the brightness remaining approximately the same, so that such a display is particularly suitable for the constant displays in a motor vehicle, which must be perfectly readable under variable light conditions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
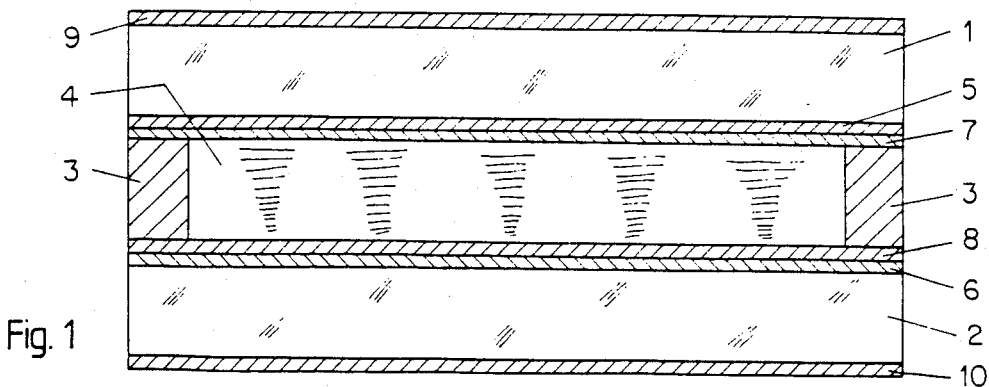
FIG. 1 is a cross-sectional view of a liquid crystal display according to the invention.

Referring now to the drawings, a liquid crystal display according to the invention is shown in FIG. 1. The display cell consists of two support plates 1, 2 of glass and an edge 3 which, as usual, is formed from glass fibers enclosed in hardened epoxy resin adhesive. A nematic liquid crystal 4 with positive dielectric anisotropy, especially the liquid crystal mixture ZLI 1694 of the Merck company, Darmstadt (FRG) is filled in the cell. Two percent by weight of a dichroic dye are added to this liquid crystal. To support plates 1 and 2 are applied electrode coatings 5 and 6 which, in this case, consist of strips so that a dot matrix display is formed. Of course, other forms of electrode coatings 5 and 6 could be selected as, for example, those in a seven-segment display. Orientation coatings 7 and 8 of silane are applied to electrode coatings 5 and 6. The orientation directions of the orientation coatings enclose an angle $\alpha$ less than or equal to 80°. Front polarizer 9 and back polarizer 10, which consist of Polaroid films Q 12--35 of the Nitto company, Japan, are glued to the outer surfaces of support plates 1 and 2. The polarization direction of front polarizer 9 runs parallel to the orientation direction of orientation coating 7; the polarization direction of back polarizer 10 runs perpendicular to the orientation direction of orientation coating 8. The polarization directions of the polarizers therefore form an angle $\beta = 90° - \alpha$, which is greater than or equal to 10°. The polarizers have an extinction power of at least 100 and perhaps greater than 1000, which is defined as the ratio between the transmission with parallel polarizers and the transmission with crossed polarizers. In this way, a considerably improved contrast ratio is obtained in comparison with the usual rotating cells.

The differences in the operational data of four different display cells can be gathered from the table below. The liquid crystal mixture ZLI 1694 is filled in the four cells I-IV, with 2% by weight of a dichroic dye being added, in addition, to cell IV. The individual parameters in the table have the following meaning:

$\alpha$: the angle between the orientation directions of the orientation coatings (angle of twist of the liquid crystal), d: the thickness of the liquid crystal coating, $T_o$: the transmission of the display cell in the unactuated state, $T_v$: the transmission of the display cell in the actuated state, the extinction power or contrast ratio of the display cell, which is equal to the ratio $T_v/T_o$, $U_{10,40}$: the operating voltage at a temperature of 293 K., a transmission of 10% and a viewing angle of 40° to the perpendicular, $U_{50,0}$: the operating voltage at a temperature of 293 K., a transmission of 50% and a viewing angle of 0° to the perpendicular, M: the ratio $U_{50,0}/U_{10,40}$, that is a measurement for multiplexing capability (cf IEEE Trans. on El. Dev. Vol. ED-21, No. 2 (Feb. 1974), pp 146–155).

|  | Cell | | | |
| --- | --- | --- | --- | --- |
|  | I 90° | II 90° | III 60° | IV 60° |
| d | 11 | 9 | 9 | 9 |
| $T_o$ | 1.0 | 1.1 | 0.7 | 0.4 |
| $T_v$ | 24.3 | 24.3 | 17.7 | 15.8 |
|  | 24 | 22 | 25 | 40 |
| $U_{10, 40}$ | 1.68 | 1.60 | 1.59 | 1.60 |
| $U_{50, 0}$ | 2.68 | 2.48 | 2.59 | 2.61 |
| M | 1.60 | 1.55 | 1.63 | 1.63 |

As is immediately evident from the above table, the fourth display cell, which meets the conditions according to the invention, has a considerably improved contrast ratio over the other three display cells I to III without the brightness in relation to III being greatly reduced.

Figure 2:
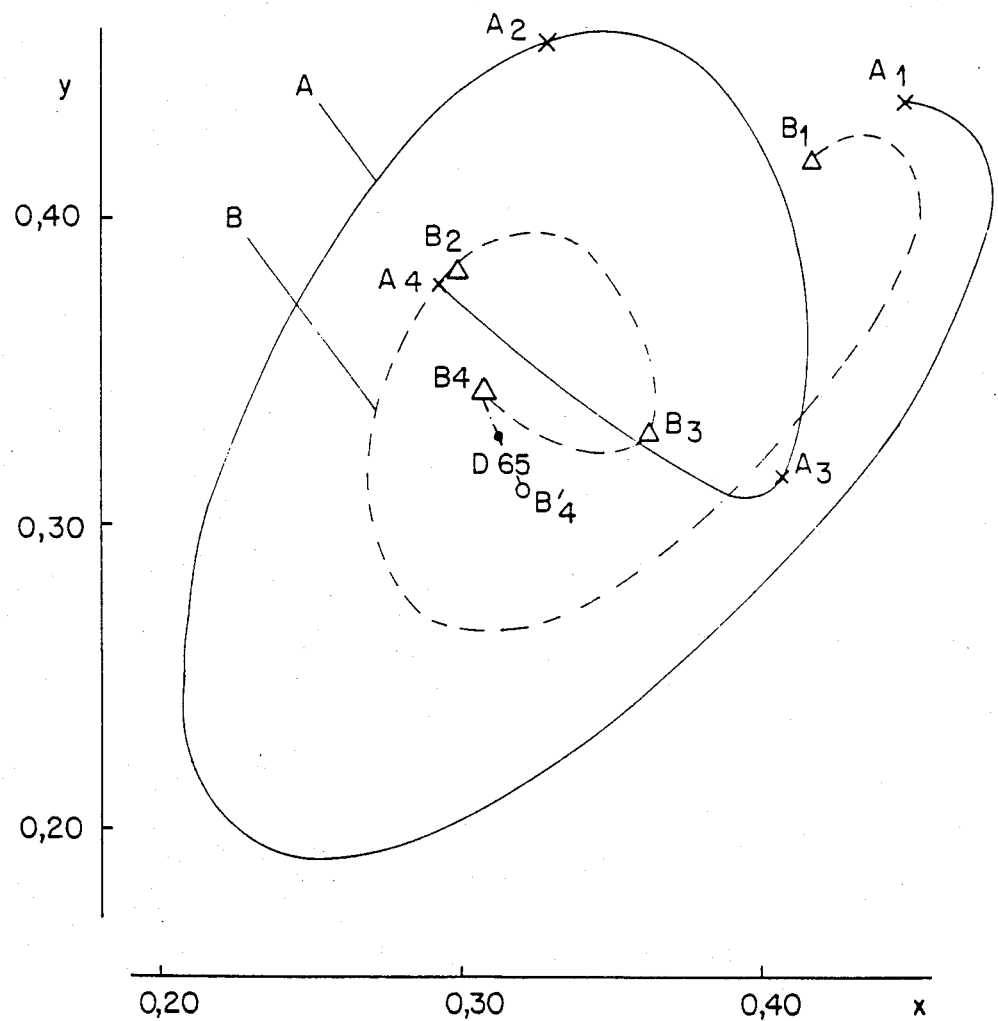
FIG. 2 is a graph illustrating the color diagrams of two different displays with d·$\Delta$n as parameters.

The condition according to the invention for the product of the coating thickness and the anisotropy of the index of refraction $d \cdot \Delta n$ can be deduced directly from FIG. 2. As is well known, colors can be characterized by the x and y coordinates on the CIE [International Commission on Illumination] color diagram (1964). Details in this regard can be obtained from the book "Color in Business and Industry" by Judd and Wyszecki. The so-called uncolored point for average daylight, indicated by D 65 in FIG. 2, thus has the coordinates x=0.313 and y=0.329. The farther a point on this diagram is from point D 65, the greater the matching coloring. FIG. 2 now shows the relation between $d \cdot \Delta n$ and color of the display in the CIE color diagram. Curve A relates to a cell with a twist of the liquid crystal of 90°, curve B a cell with a twist of 45°. The product $d \cdot \Delta n$ therefore goes through values of 0.28 μm ($A_1$, $B_1$), 0.70 μm ($A_2$, $B_2$), 0.98 μm ($A_3$, $B_3$) and 1.26 μm ($A_4$, $B_4$). As can be immediately gathered from FIG. 2, the cell with a twist of 45° (curve B) is less colored than the cell with a twist of 90° (curve A). By an optimal choice of the product $d \cdot \Delta n$ and of the angle of twist of the liquid crystal as achromatic a display as possible is first obtained. Closer studies have shown that the angle α enclosed by the orientation directions is preferably between 60° and 40°. In this connection, it should be considered that a smaller angle of twist reduces the degree of multiplexing (see table). To obtain a completely neutral colored display, in addition, a dye up to 3% by weight is added, which exhibits the complement of the spectral color of the display. The color point of the dye (point $B_4'$ in FIG. 2) is determined by the connecting line between the color point of the display (point $B_4$) and the uncolored point D 65, with the distance from points $B_4$ and $B_4'$ being equal to this point.

Figure 3:
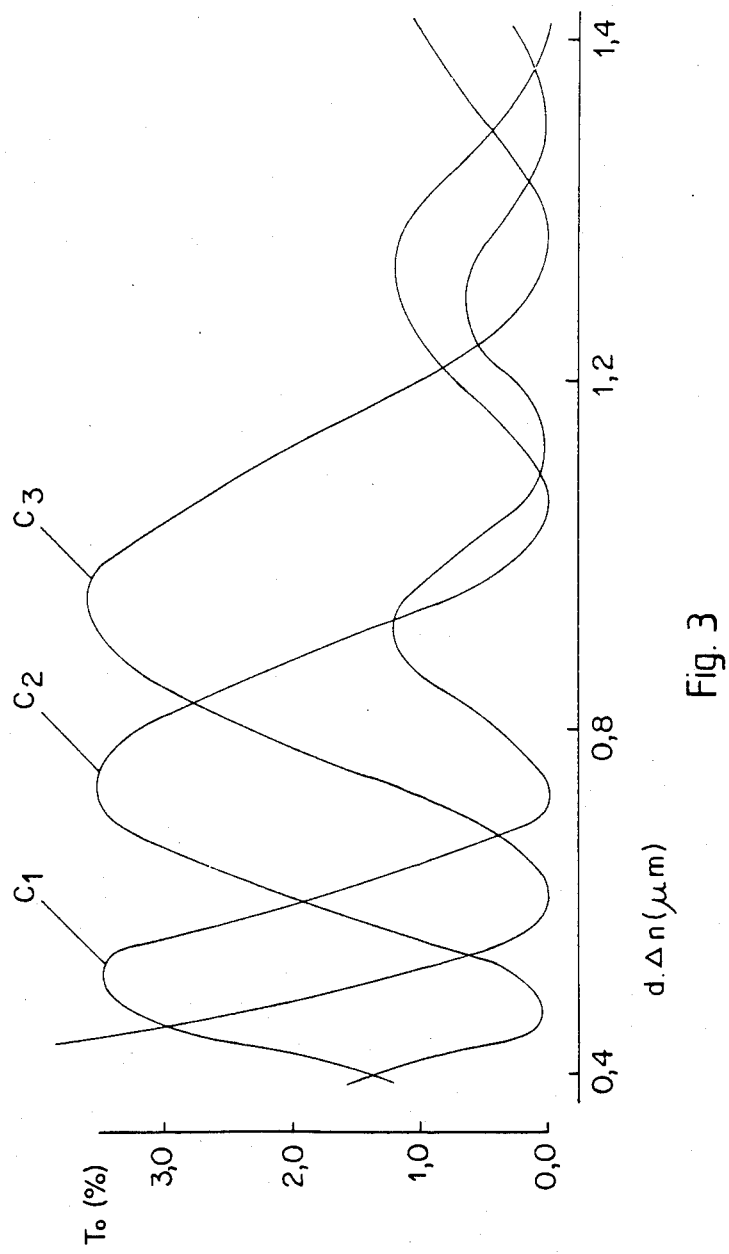
FIG. 3 is a graph illustrating the transmission curves for different spectral colors in the case of a display according to the invention.

FIG. 3 shows the transmission curves in the case of three different spectral colors with the product $d \cdot \Delta n$ as a variable. The transmission coefficient $T_o$ (in %) of the unactuated display cell (dark) is given on the ordinate. In this connection, it should be noted that the transmission coefficient in the actuated state (bright) amounts to about 25%. The first curve $C_1$ is plotted in the case of illumination with blue light (450 nm), the second curve $C_2$ with green light (550 nm) and the third curve $C_3$ with red light (650 nm). It is evident from this figure that in the case of a specific produce $d \cdot \Delta n$ the display absorbs a specific spectral color more poorly. By addition of a dye with the complementary spectral color the absorption of the total beamed light is improved and thus the contrast ratio is enhanced. Moreover, the display appears clearer, even if the brightness in the actuated state is approximately unchanged.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A liquid crystal display comprising:
   two parallel support plates separated by a peripheral border to form a cell in the space between said plates and said border;
   a layer of nematic liquid crystal with positive dielectric anisotropy filled in said cell;
   electrode coatings formed on inside surfaces of said plates;
   first and second orientation coatings formed on respective of said electrode coatings, said orientation coatings defining orientation directions enclosing an angle (α) less than 80°,
   a first polarizer associated with said first orientation coating and having a polarization direction which runs parallel to the orientation direction of said first orientation coating;
   a second polarizer associated with said second orientation coating and having a polarization direction which runs perpendicular to the orientation direction of the second orientation coating;
   said polarizers having an extinction power greater than 100;
   said liquid crystal layer having a thickness (d) and defining an anisotropy of an index of refraction (Δn) the product of which is less than 1.3 μm; and
   a dichroic dye of up to 3% by weight added to the liquid crystal layer.

2. A liquid crystal display according to claim 1, wherein said dichroic dye has a spectral color forming the complement of a spectral color for the product of the thickness (d) and the anisotropy of the index of refraction (Δn) of the liquid crystal.

3. A liquid crystal display according to claim 2, wherein the angle (α) enclosed by the orientation directions is in between 60° and 40°.

4. A liquid crystal display according to claim 2, wherein the extinction power of the polarizers is greater than 1000.

5. A liquid crystal display, according to claim 2, wherein said liquid crystal layer comprises less than 2% by weight of said dichroic dye.

* * * * *